(12) United States Patent
Urase et al.

(10) Patent No.: US 9,176,220 B2
(45) Date of Patent: Nov. 3, 2015

(54) ULTRASONIC SENSOR

(75) Inventors: Hiroshi Urase, Osaka (JP); Yasusi Nagano, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 916 days.

(21) Appl. No.: 13/393,870

(22) PCT Filed: Aug. 31, 2010

(86) PCT No.: PCT/IB2010/002129
§ 371 (c)(1),
(2), (4) Date: Mar. 23, 2012

(87) PCT Pub. No.: WO2011/027201
PCT Pub. Date: Mar. 10, 2011

(65) Prior Publication Data
US 2012/0176866 A1 Jul. 12, 2012

(30) Foreign Application Priority Data
Sep. 2, 2009 (JP) .................................. 2009-202878

(51) Int. Cl.
G01S 7/00 (2006.01)
G01S 7/521 (2006.01)
G10K 11/00 (2006.01)

(52) U.S. Cl.
CPC .............. *G01S 7/521* (2013.01); *G10K 11/004* (2013.01)

(58) Field of Classification Search
CPC .............................. G10K 11/004; G01S 7/521
USPC ............. 367/178, 180, 188, 909, 140; 73/649
See application file for complete search history.

(56) References Cited

U.S. PATENT DOCUMENTS

| 4,326,274 | A | * | 4/1982 | Hotta et al. | .................... 367/118 |
| 4,709,359 | A | * | 11/1987 | Loftin | ............................ 367/155 |
| 5,363,341 | A | * | 11/1994 | Schwald et al. | ............... 367/140 |
| 6,272,921 | B1 | * | 8/2001 | Ivanovich et al. | .......... 73/290 V |
| 7,317,663 | B2 | | 1/2008 | Kawashima et al. | |

(Continued)

FOREIGN PATENT DOCUMENTS

| JP | 2003214902 | 7/2003 |
| JP | 200524351 | 1/2005 |

(Continued)

OTHER PUBLICATIONS

The International Search Report from PCT/IB2010/002129.

*Primary Examiner* — Isam Alsomiri
*Assistant Examiner* — Hovhannes Baghdasaryan
(74) *Attorney, Agent, or Firm* — Bacon & Thomas, PLLC

(57) ABSTRACT

An ultrasonic sensor includes a transceiver device for transmitting and receiving ultrasonic waves; a circuit board mounted with an electronic circuit processing ultrasonic signals transmitted and received through the transceiver device; a housing including a device storing portion storing the transceiver device, a board storing portion storing the circuit board and a communication hole for bringing the device storing portion and the board storing portion into communication with each other, the board storing portion having an opening; and an electric connection unit extending through the communication hole to electrically interconnect the transceiver device and the circuit board. A cover member is installed in the opening of the board storing portion to hermetically seal the board storing portion.

25 Claims, 13 Drawing Sheets

(56) References Cited

U.S. PATENT DOCUMENTS

| | | | |
|---|---|---|---|
| 2006/0241474 A1* | 10/2006 | Kawashima et al. | 600/459 |
| 2007/0062292 A1* | 3/2007 | Sato et al. | 73/649 |
| 2007/0237031 A1* | 10/2007 | Kawashima et al. | 367/140 |
| 2008/0293998 A1* | 11/2008 | Andrews | 600/25 |
| 2009/0073328 A1* | 3/2009 | Gunderson et al. | 349/1 |
| 2011/0088479 A1 | 4/2011 | Urase et al. | |

FOREIGN PATENT DOCUMENTS

| | | |
|---|---|---|
| JP | 2007281999 | 10/2007 |
| JP | 4609537 | 10/2010 |
| WO | 2009154170 | 12/2009 |

* cited by examiner

ULTRASONIC SENSOR

FIELD OF THE INVENTION

The present invention relates to an ultrasonic sensor that is mounted on, e.g., a motor vehicle to be used for obstacle detection or the like.

BACKGROUND OF THE INVENTION

Conventionally, there is available an ultrasonic sensor that includes, as shown in FIG. 13, a hollow housing 101 having an opening on one surface thereof, a transceiver device 102 having a wave transceiving surface for transmitting and receiving ultrasonic waves, the wave transceiving surface exposed on the other surface of the housing 101, a circuit board 103 arranged within the housing 101 and mounted with an electronic circuit for processing ultrasonic waves transmitted and received through the transceiver device 102, a wiring line 104 electrically interconnecting the transceiver device 102 and the circuit board 103, a cover member 105 installed to cover the opening of the housing 101, and a terminal 106 connected at one end to the circuit board 103 by welding or other methods and at the other end to a power supply terminal (not shown).

When used in a motor vehicle, the ultrasonic sensor is installed in a portion highly susceptible to drenching and severe vibrating, e.g., a bumper or a front grill. In many conventional ultrasonic sensors, therefore, a filler material 107 (such as silicone or the like) having hydrophobicity and elasticity is filled in the housing 101 accommodating the circuit board 103 and so forth. It is a typical configuration to secure an increased waterproof property and a high vibration resistance in this manner (see, e.g., Japanese Patent Application Publication No. 2005-24351).

In the conventional example stated above, however, the weight and cost of the ultrasonic sensor is proportionately increased as the filler material 107 is filled in the housing 101. In addition, there is a possibility that, due to the existence of the filler material 107, distortions are generated in the circuit board 103 arranged within the housing 101. It is also likely that cracks are generated in the solder portions between the circuit board 103 and the electronic parts mounted on the circuit board 103. There is also the likelihood that the sensing area characteristics of the sensor are changed before and after filling the filler material 107. Other causes of generating distortions in the circuit board 103 include, e.g., an external load generated by the thermal expansion and shrinkage of the filler material 107. Examples of the change in the sensing area characteristics before and after filling the filler material 107 include the narrowing of a sensing area of the sensor. There is also a problem in that a great deal of time is required in the drying process. In this viewpoint, there remains a room for improvement.

SUMMARY OF THE INVENTION

In view of the above, the present invention provides an ultrasonic sensor capable of suppressing an increase in weight and cost while securing a waterproof property, capable of preventing generation of distortions in a circuit board and capable of shortening a manufacturing time.

In accordance with one aspect of the present invention, there is provided an ultrasonic sensor, including: a transceiver device for transmitting and receiving ultrasonic waves; a circuit board mounted with an electronic circuit processing ultrasonic signals transmitted and received through the transceiver device; a housing including a device storing portion storing the transceiver device, a board storing portion storing the circuit board and a communication hole for bringing the device storing portion and the board storing portion into communication with each other, the board storing portion having an opening; an electric connection unit extending through the communication hole to electrically interconnect the transceiver device and the circuit board; and a cover member installed in the opening of the board storing portion to hermetically seal the board storing portion.

With this configuration, the board storing portion is hermetically sealed by the cover member. This makes it possible to easily secure the waterproof property of the board storing portion. Since there is no need to fill a filler material into the board storing portion, it is possible to suppress an increase in weight and cost, to prevent generation of distortions in the circuit board and to shorten a manufacturing time.

Preferably, the cover member installed in the opening may be welded to the housing.

With this configuration, the cover member is welded to the housing. This makes it possible to enhance the waterproof property of the board storing portion.

Preferably, the cover member may be laser-welded to the housing.

With this configuration, the cover member is laser-welded to the housing. This makes it possible to enhance the waterproof property of the board storing portion.

Preferably, the cover member is ultrasonically welded to the housing.

With this configuration, the cover member is ultrasonically welded to the housing. This makes it possible to enhance the waterproof property of the board storing portion.

Preferably, the cover member installed in the opening may be adhesively bonded to the housing.

With this configuration, the cover member is adhesively bonded to the housing. This makes it possible to easily maintain the waterproof property of the board storing portion.

It is preferred that the sensor of the present invention further includes a seal member interposed between the cover member and a peripheral edge of the opening of the board storing portion With this configuration, it is possible to further enhance the waterproof property of the board storing portion.

Preferably, the communication hole may be closed by an adhesive agent.

With this configuration, it is possible to prevent moistures from infiltrating from the device storing portion into the board storing portion, thereby further enhancing the waterproof property of the board storing portion.

Since the adhesive agent is not filled in the board storing portion but is filled in only the communication hole. It is therefore possible to suppress an increase in weight and cost, to prevent generation of distortions in the circuit board and to shorten a manufacturing time.

Preferably, the board storing portion may include a pit portion having a bottom surface where one end of the communication hole is opened, the adhesive agent being filled in at least the communication hole.

With this configuration, it is possible to easily fill the adhesive agent into the communication hole, thereby further enhancing the waterproof property of the board storing portion.

Preferably, the board storing portion has a bottom surface where one end of the communication hole is opened and an annular rib arranged around the communication hole to protrude from the bottom surface of the board storing portion, the adhesive agent being filled in at least the communication hole.

With this configuration, it is possible to easily fill the adhesive agent into the communication hole, thereby further enhancing the waterproof property of the board storing portion.

It is preferred that the sensor of the present invention further includes a seal plate closing the communication hole, the seal plate having a passage hole through which the electric connection unit extends.

With this configuration, it is possible to prevent moistures from infiltrating from the device storing portion into the board storing portion, thereby further enhancing the waterproof property of the board storing portion.

Preferably, the seal plate may be welded to the transceiver device.

With this configuration, it is possible to prevent moistures from infiltrating from the device storing portion into the board storing portion through the passage hole of the seal plate, thereby maintaining the waterproof property of the board storing portion.

Preferably, the seal plate may be laser-welded to the transceiver device.

With this configuration, it is possible to further enhance the waterproof property of the board storing portion.

Preferably, the seal plate may be ultrasonically welded to the transceiver device.

With this configuration, it is possible to further enhance the waterproof property of the board storing portion.

Preferably, the seal plate may be welded to the housing.

With this configuration, it is possible to prevent moistures from infiltrating from the device storing portion into the board storing portion through between the housing and the seal plate, thereby maintaining the waterproof property of the board storing portion.

Preferably, the seal plate may be laser-welded to the housing.

With this configuration, it is possible to further enhance the waterproof property of the board storing portion.

Preferably, the seal plate may be ultrasonically welded to the housing.

With this configuration, it is possible to further enhance the waterproof property of the board storing portion.

Preferably, the seal plate may be temporarily fixed to the transceiver device by welding and then adhesively bonded to the transceiver device.

With this configuration, it is possible for the welding to increase the fixing accuracy of the seal plate and for the adhesive agent to further enhance the waterproof property of the board storing portion.

Preferably, the seal plate may be temporarily fixed to the housing by welding and then adhesively bonded to the housing.

With this configuration, it is possible for the welding to increase the fixing accuracy of the seal plate and for the adhesive agent to further enhance the waterproof property of the board storing portion.

Preferably, a sealing material may be provided in at least one of a gap between the seal plate and the transceiver device and a gap between the seal plate and the housing.

With this configuration, it is possible to further enhance the waterproof property of the board storing portion.

Preferably, the seal plate may have a projecting portion gripped by a worker when assembling the ultrasonic sensor.

With this configuration, it is possible to easily fix the seal plate in place.

Preferably, the projecting portion may be configured to support the circuit board.

With this configuration, there is no need to provide an additional support portion for supporting the circuit board, because the projecting portion of the seal plate supports the circuit board. It is therefore possible to simplify the structure of the ultrasonic sensor.

Preferably, the projecting portion may be welded to the circuit board to fix the circuit board in place.

With this configuration, there is no need to provide an additional welding rib for fixing the circuit board in place. It is therefore possible to simplify the structure of the ultrasonic sensor.

Preferably, the circuit board may be arranged in an opposing relationship with a bottom surface of the board storing portion, the board storing portion including a guide member for guiding the circuit board from the opening of the board storing portion to a specified position on the bottom surface of the board storing portion.

With this configuration, it is possible to easily store the circuit board in a specified position within the board storing portion.

Preferably, the board storing portion may include a support rib supporting the circuit board and a welding rib welded to the circuit board to grip the circuit board in cooperation with the support rib.

With this configuration, it is possible to more stably fix the circuit board in place by gripping the circuit board with the support rib and the welding rib.

Preferably, the board storing portion may include a support rib supporting the circuit board, the cover member including a top plate and a pressing protrusion extending from the top plate toward the support rib to grip and fix the circuit board in cooperation with the support rib.

In accordance with one aspect of the present invention, there is provided an ultrasonic sensor, including: a transceiver device for transmitting and receiving ultrasonic waves; a circuit board mounted with an electronic circuit for processing ultrasonic signals transmitted and received through the transceiver device; a housing including a device storing portion storing the transceiver device, a board storing portion storing the circuit board and a communication hole for bringing the device storing portion and the board storing portion into communication with each other, the board storing portion having an opening; and an electric connection unit extending through the communication hole to electrically interconnect the transceiver device and the circuit board, the circuit board having a surface coated with an insulating material.

With this configuration, the circuit board itself has a waterproof property, which makes it unnecessary to hermetically seal the board storing portion. This eliminates the need to perform a sealing work in the welding process. It is therefore possible to reduce the number of work steps.

Since there is no need to fill a filler material into the board storing portion, it is possible to suppress an increase in weight and cost, to prevent generation of distortions in the circuit board and to shorten a manufacturing time.

According to the embodiments of the present invention, it is possible to suppress an increase in weight and cost while securing a waterproof property, to prevent generation of distortions in a circuit board and to shorten a manufacturing time.

BRIEF DESCRIPTION OF THE DRAWINGS

The objects and features of the present invention will become apparent from the following description of preferred embodiments given in conjunction with the accompanying drawings, in which.

DETAILED DESCRIPTION OF THE PREFERRED EMBODIMENTS

Preferred embodiments of an ultrasonic sensor of the present invention will now be described in detail with reference to the accompanying drawings. Throughout the drawings, identical or similar components will be designated by like reference symbols, and redundant description thereof will be omitted.

First Embodiment

Figure 1:
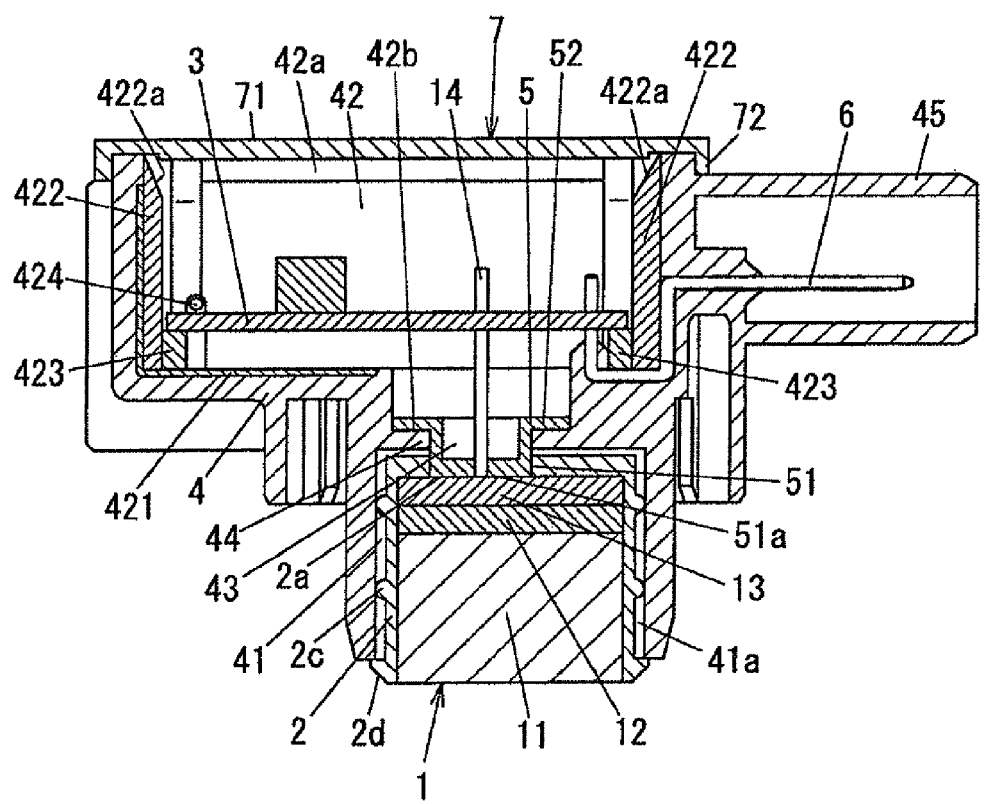
FIG. 1 is a section view showing an ultrasonic sensor according to a first embodiment of the present invention.

Referring to FIG. 1, the ultrasonic sensor of the present embodiment includes: a transceiver device 1 for transmitting and receiving ultrasonic waves; a cover 2 covering the surface of the transceiver device 1 except for the wave transceiving surface thereof; a circuit board 3 mounted with an electronic circuit for processing ultrasonic signals transmitted and received through the transceiver device 1; a housing 4 having a device storing portion 41 for accommodation of the transceiver device 1 and a board storing portion 42 for accommodation of the circuit board 3, the board storing portion 42 having an opening 42a, the housing 4 having a communication hole 43 through which the device storing portion 41 and the board storing portion 42 communicate with each other; a seal plate 5 closing the communication hole 43; an outer connection terminal 6 connected at one end to the circuit board 3 and at the other end to an external terminal (not shown); and a cover member installed to cover the opening of the board storing portion 42.

Figure 2A:
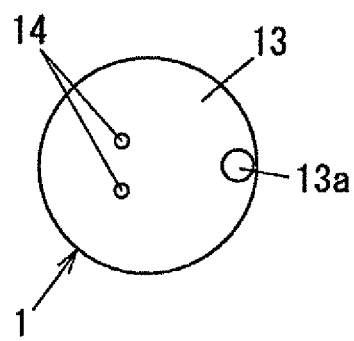
FIGS. 2A and 2B are front and section views illustrating a transceiver device employed in the ultrasonic sensor according to the first embodiment.
Figure 2B:
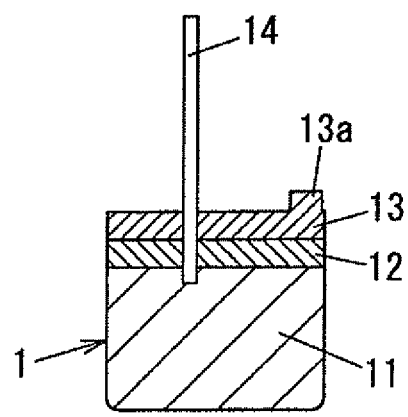

As shown in FIG. 2, the transceiver device 1 includes a piezoelectric element (not shown), a case 11 for storing the piezoelectric element therein, a spacer 12 attached to the case 11, a base 13 laminated on the spacer 12 and connector terminals (wiring line) 14 each electrically connected at one end to the piezoelectric element and protruding away from the case 11 at the other end.

The case 11 is made of black-colored polybutylene terephthalate and is formed into a substantially cylindrical shape with the upper surface thereof opened. The piezoelectric element is stored within the case 11. One surface of the case 11 is used as a wave transceiving surface for transmitting and receiving ultrasonic waves.

The spacer 12 is made of, e.g., a silicone resin, and is formed into a substantially disc-like shape. The spacer 12 is attached to the other surface of the case 11. The spacer 12 is provided to absorb the ultrasonic waves transmitted toward the other surface of the case 11 from the piezoelectric element.

The base 13 is formed into a substantially disc-like shape and is laminated on the spacer 12.

One end of each connector terminal 14 is connected to an electrode of the piezoelectric element. The other end of each connector terminal 14 is led out to the outside through the case 11, the spacer 12 and the base 13.

Figure 3A:
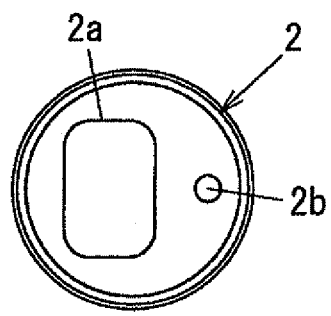
FIGS. 3A and 3B are front and section views illustrating a cover employed in the ultrasonic sensor according to the first embodiment.
Figure 3B:
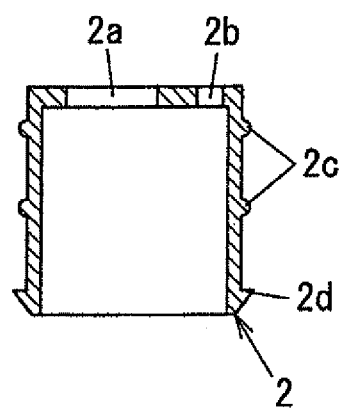

As shown in FIG. 3, the cover 2 is made of an elastic material and is formed into a substantially cylindrical shape with one surface thereof opened. The cover 2 surrounds the periphery of the transceiver device 1. On the other surface of the cover 2, there are formed an insertion hole 2a into which the connector terminals 14 of the transceiver device 1 is inserted and a positioning hole 2b into which a positioning rib 13a protruding from the base 13 is fitted. Protrusions 2c are formed on the outer circumferential surface of the cover 2 to extend along the outer circumferential surface. A positioning lug 2d is formed in the peripheral edge of the opening of cover 2 to protrude outward. In this regard, the outer diameter of the portion of the cover 2 having the protrusions 2c is substantially equal to the inner diameter of the device storing portion 41. The outer diameter of the portion of the cover 2 having the positioning lug 2d (the outer diameter of one end of the cover 2) is larger than the inner diameter of the device storing portion 41.

The circuit board 3 is stored into the board storing portion 42 through the opening 42a and is connected to the connector terminals 14 extending through the communication hole 43.

The housing 4 includes: the substantially hollow box-like board storing portion 42 having the opening 42a on one surface thereof; the substantially cylindrical device storing portion 41 adjoining to the board storing portion 42 with the other surface (a partition wall 44) of the board storing portion 42 interposed therebetween, the device storing portion 41 having an opening 41a formed on one surface thereof; and the communication hole 43 extending through the partition wall 44 to bring the other surface of the board storing portion 42 and the other surface of the device storing portion 41 into communication with each other.

The transceiver device 1 combined with the cover 2 is inserted into the device storing portion 41 until the positioning lug 2d comes into contact with the peripheral edge of the opening of the device storing portion 41 and is stored within the device storing portion 41 in a state that the wave transceiving surface (one surface) of the transceiver device 1 remains exposed to the outside through the opening 41a. In this regard, the protrusions 2c of the cover 2 are press-fitted to the inner wall surface of the device storing portion 41, whereby the transceiver device 1 is fixed to the inside of the device storing portion 41.

The board storing portion 42 includes a shield material 421 for shielding electromagnetic waves coming from the outside. The shield material 421 is arranged on the inner wall surface of the board storing portion 42 by molding the shield material 421 together with the housing 4. Guide members 422 are formed on a pair of mutually-opposing inner wall surfaces of the board storing portion 42.

Each of the guide members 422 is formed into a substantially prismatic columnar shape. A slant portion 422a inclined inward from the peripheral edge of the opening 42a is formed in the tip end portion of each of the guide members 422. Since the spacing between the opposing guide members 422 is set to allow sliding movement of the circuit board 3, the circuit board 3 is guided from the opening 42a of the board storing portion 42 into the board storing portion 42 along the guide members 422 and is easily stored in a specified position on the bottom surface of the board storing portion 42.

Figure 4A:
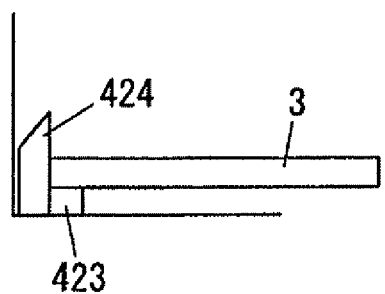
FIGS. 4A and 4B are enlarged views illustrating certain major portions of the ultrasonic sensor according to the first embodiment.
Figure 4B:
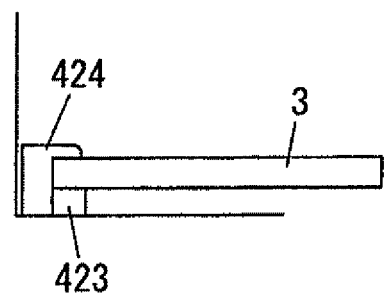

As shown in FIG. 4A, rod-like support ribs 423 and rod-like welding ribs 424 are formed to protrude from the bottom surface of the board storing portion 42. The circuit board 3 is placed on the support ribs 423 with the peripheral edge of one surface of the circuit board 3 making contact with the support ribs 423. When welding the welding ribs 424 to the circuit board 3, the tip end portions of the welding ribs 424 are bent so that the welding ribs 424 can have a substantially L-like shape as shown in FIG. 43. The tip end portions of the welding ribs 424 are welded to the other surface of the circuit board 3. As a result, the circuit board 3 is gripped by the support ribs 423 and the welding ribs 424 and is fixed in place.

Figure 5A:
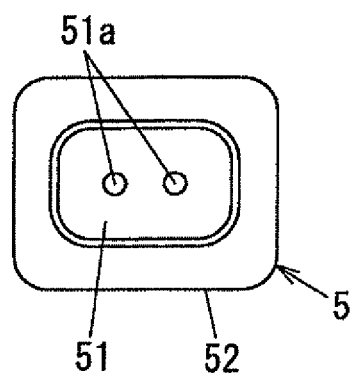
FIGS. 5A, 5B and 5C are front, side and section views illustrating a seal plate employed in the ultrasonic sensor according to the first embodiment.
Figure 5B:
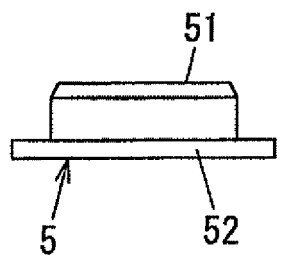
Figure 5C:
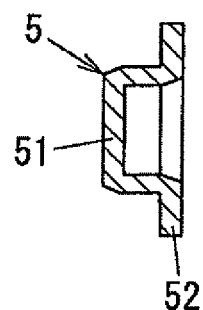

As shown in FIGS. 5A, 5B and 5C, the seal plate 5 is made of white (light-transmitting) polybutylene terephthalate and is formed into a substantially rectangular plate shape. A recess portion 51 is formed substantially in the central area of the seal plate 5. In other words, the seal plate 5 includes the recess portion 51 and a flange portion 52 formed in the peripheral edge of the opening of the recess portion 51.

A pit portion 42b is formed on the bottom surface of the board storing portion 42. One end of the communication hole 43 is opened on the bottom surface of the pit portion 42b. The seal plate 5 is arranged within the pit portion 42b with the recess portion 51 fitted to the communication hole 43. Passage holes 51a are formed on the bottom surface of the recess portion 51 of the seal plate 5. The connector terminals 14 of the transceiver device 1 extend through the passage holes 51a.

The flange portion 52 of the seal plate 5 is bonded to the bottom surface of the pit portion 42b of the board storing portion 42 by ultrasonic welding or laser welding. The welding method is not limited to the ultrasonic welding or the laser welding but may be vibration welding. In place of the welding, bonding may be performed through the use of an adhesive agent. Thus the gap between the seal plate 5 and the housing 4 is closed.

The bottom surface of the recess portion 51 of the seal plate 5 is inserted through the communication hole 43 and the insertion hole 2a of the cover 2, thereby making contact with the bottom surface (the base 13) of the transceiver device 1. The recess portion 51 and the base 13 are bonded to each other by a welding method such as ultrasonic welding, laser welding or vibration welding or through the use of an adhesive agent. As a result, the gap between the seal plate 5 and the transceiver device 1 is closed.

With the configuration described above, the route extending from the device storing portion 41 to the board storing portion 42 is completely closed. This makes it possible to prevent moistures from infiltrating from the device storing portion 41 into the board storing portion 42.

The outer connection terminal 6 is one-piece molded with the housing 4 by an insert-molding method. One end of the outer connection terminal 6 protrudes into a substantially cylindrical connector portion 45 installed on the outer surface of the housing 4. The other end of the outer connection terminal 6 protrudes into the board storing portion 42. In this connection, one end of the outer connection terminal 6 is connected to an external terminal (not shown). The other end of the outer connection terminal 6 is arranged to protrude from the bottom surface of the board storing portion 42 and is electrically connected to the circuit board 3 by soldering or the like.

The circuit board 3 is supplied with electric power through the outer connection terminal 6 and is designed to output a drive pulse signal to the transceiver device 1. Upon receiving the drive pulse signal, the transceiver device 1 transmits ultrasonic waves. Next, the transceiver device 1 receives ultrasonic waves reflected from an obstacle and outputs a wave receiving signal to the circuit board 3. The circuit board 3 calculates the distance to the obstacle by measuring the time taken until the wave receiving signal is inputted after outputting the drive pulse signal. The calculation result is outputted to a control circuit or the like through the outer connection terminal 6.

The cover member 7 includes a substantially rectangular flat top plate 71 made of white (light-transmitting) polybutylene terephthalate and an extension portion 72 extending from the peripheral edge of the top plate 71 in a substantially perpendicular relationship with respect to the top plate 71. The cover member 7 is installed to cover the opening 42a of the board storing portion 42 with the top plate 71 facing toward the bottom surface of the board storing portion 42. The top plate 71 of the cover member 7 and the peripheral edge portion of the opening 42a of the board storing portion 42 are hermetically bonded to each other by ultrasonic welding or laser welding. The welding method is not limited to the ultrasonic welding or the laser welding but may be vibration welding. In place of the welding, bonding may be performed through the use of an adhesive agent.

As a result, the gap between the cover member 7 and the housing 4 is closed. This makes it possible to prevent moistures from infiltrating into the board storing portion 42 through the opening 42a of the board storing portion 42.

In the ultrasonic sensor of the present embodiment described above, the seal plate 5 is welded to the housing 4 and the transceiver device 1 to thereby close the communication hole 43. The cover member 7 is welded to the housing 4 to thereby close the opening 42a of the board storing portion 42. Thus the board storing portion 42 has a sealed waterproof structure.

With the ultrasonic sensor of the present embodiment, it is therefore possible to, while securing a waterproof property, eliminate the need to fill a filler material into the board storing portion 42, which would otherwise be needed to prevent the circuit board 3 from getting wet. This makes it possible to suppress an increase in weight and cost. Moreover, it is possible to prevent generation of distortions in the circuit board 3 and to shorten a manufacturing time.

A sealing material may exist in at least one of a gap between the seal plate 5 and the housing 4 and a gap between the seal plate 5 and the transceiver device 1. In addition, a sealing material may exist in a gap between the cover member 7 and the housing 4 (the peripheral edge of the opening of the board storing portion 42). This makes it possible to further enhance the waterproof property of the board storing portion 42.

Figure 6:
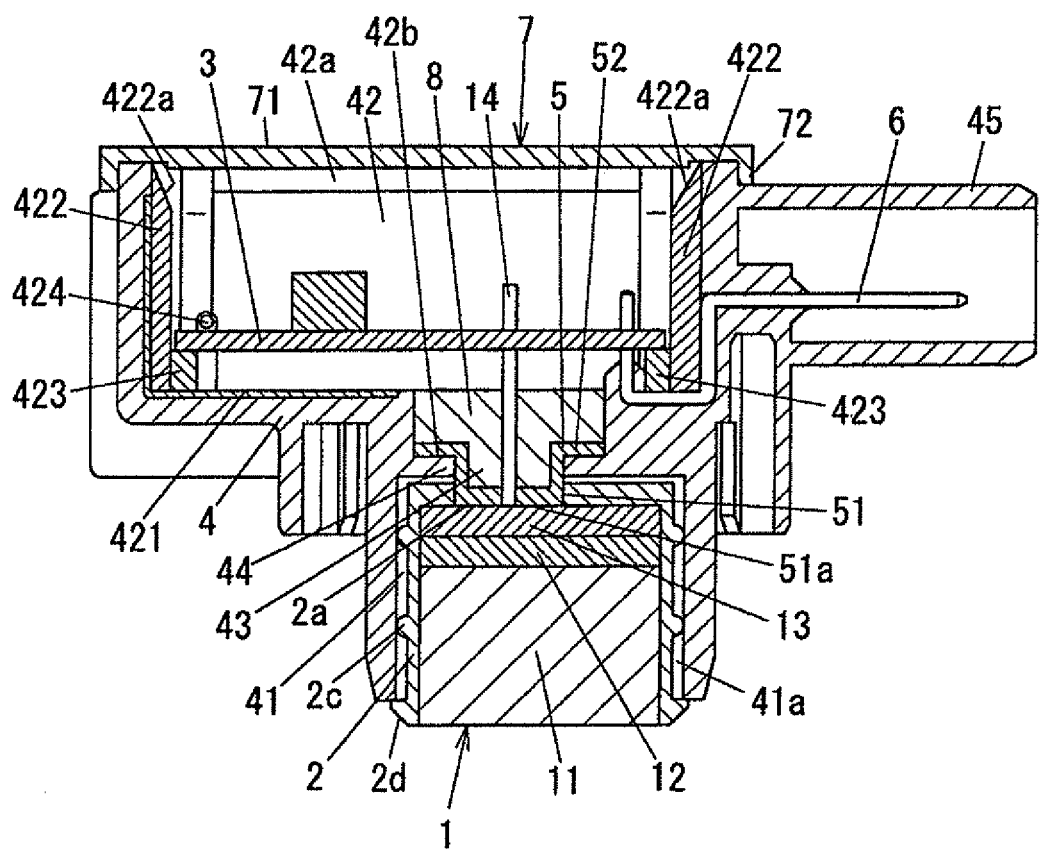
FIG. 6 is a section view showing an ultrasonic sensor according to one modified example of the first embodiment.

When bonding the seal plate 5 to the housing 4 and the transceiver device 1, as shown in FIG. 6, the seal plate 5 may be temporarily bonded to the housing 4 and the transceiver device 1 by welding. Thereafter, an adhesive agent 8 may be injected into the pit portion 42b so that the adhesive agent 8 can be filled in the space between the bottom surface of the recess portion 51 and the opening of the pit portion 42b. This makes it possible to increase the fixing accuracy of the seal plate 5 and to further enhance the waterproof property of the board storing portion 42.

Figure 7:
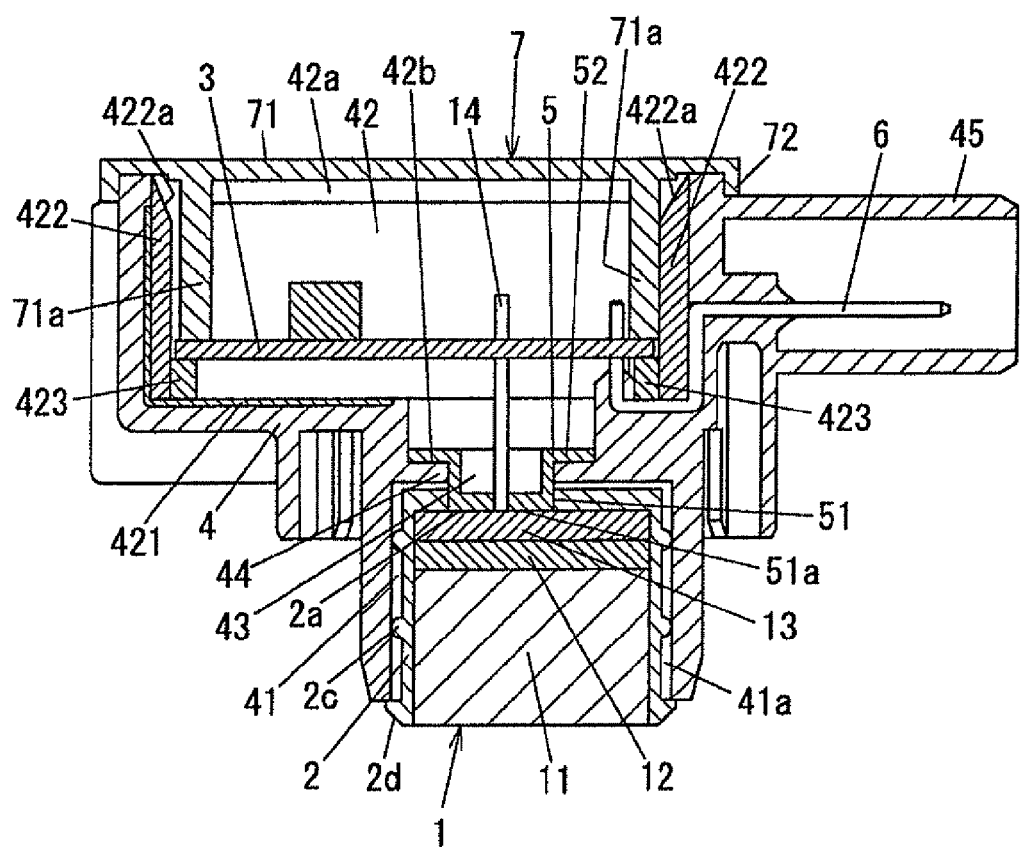
FIG. 7 is a section view showing an ultrasonic sensor according to another modified example of the first embodiment.

In the present embodiment, the circuit board 3 is fixed through the use of the support ribs 423 and the welding ribs 424 inserted through and welded to the circuit board 3. Alternatively, as shown in FIG. 7, pressing protrusions 71a opposing to the support ribs 423 may be provided to extend from the top plate 71 of the cover member 7. The circuit board 3 can be fixed in place by gripping the circuit board 3 with the pressing protrusions 71a and the support ribs 423. In this case, if the cover member 7 is installed to cover the opening 42a of the board storing portion 42, the pressing protrusions 71a press the circuit board 3 and grip the circuit board 3 in cooperation with the support ribs 423, thereby fixing the circuit board 3 in place.

Second Embodiment

The ultrasonic sensor of the present embodiment differs from the ultrasonic sensor of the first embodiment in that the seal plate 5 is omitted and the communication hole 43 is closed by only an adhesive agent 9. Other configurations remain the same as those of the first embodiment and therefore will be designated by like reference symbols with no description made thereon.

Figure 8:
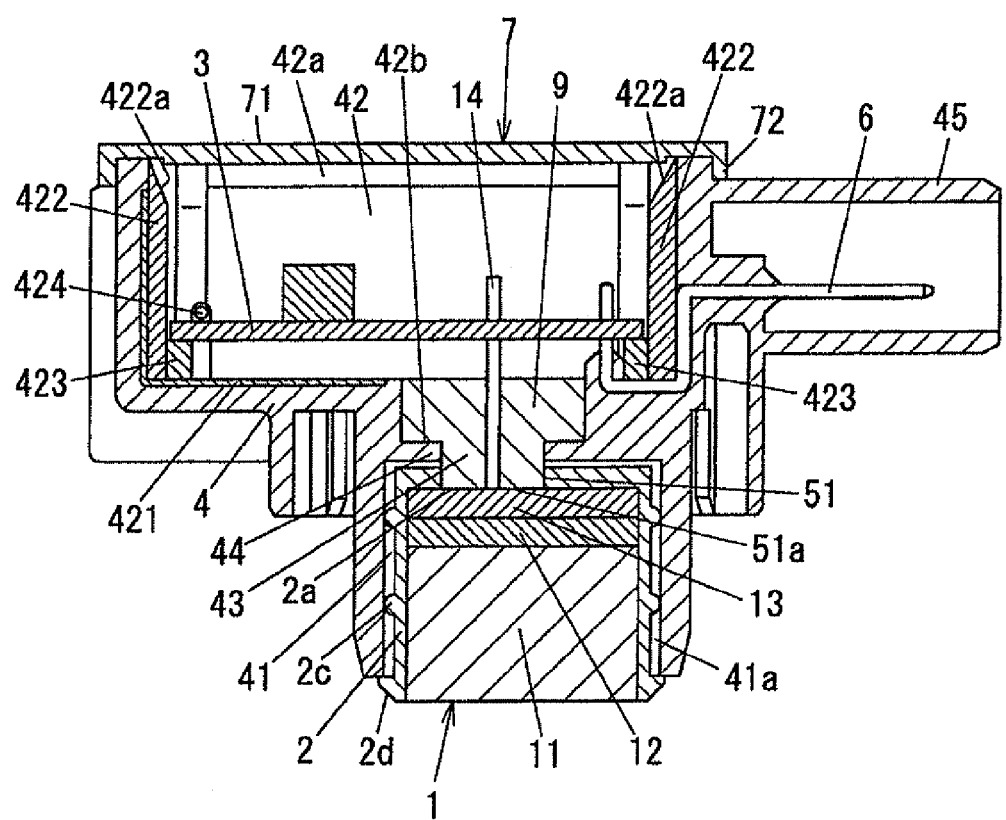
FIG. 8 is a section view showing an ultrasonic sensor according to a second embodiment of the present invention.

In the present embodiment, as shown in FIG. 8, the ultrasonic sensor does not include the seal plate 5. Thus the base 13 is exposed to the board storing portion 42 through the insertion hole 2a of the cover 2 and the communication hole 43.

The adhesive agent 9 is injected into the pit portion 42b having a relatively large opening. Thus the adhesive agent 9 flows from the pit portion 42b into the communication hole 43 having a relatively small opening. This makes it possible to easily and reliably fill the adhesive agent 9 from the pit portion 42b to the base 13. The adhesive agent 9 is filled in at least the communication hole 43, thereby closing the communication hole 43. As a result, the gap between the board storing portion 42 and the device storing portion 41 is closed. This prevents moistures from infiltrating from the device storing portion into the board storing portion 42 through the communication hole 43.

Just like the first embodiment, the opening 42a of the board storing portion 42 is covered with the cover member 7 and is closed by welding the cover member 7 to the housing 4. This makes it possible to prevent moistures from infiltrating into the board storing portion 42 through the opening 42a.

In the ultrasonic sensor of the present embodiment, therefore, the board storing portion 42 has a waterproof structure sealed by the cover member 7 and the adhesive agent 9.

Figure 9:
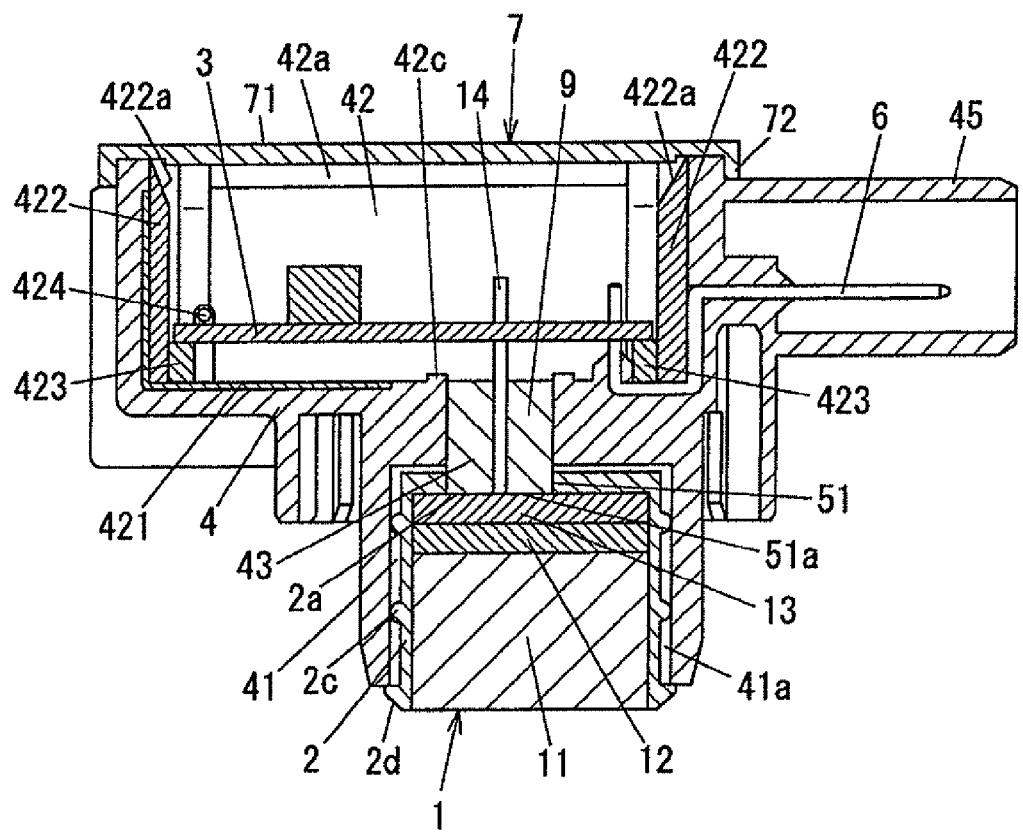
FIG. 9 is a section view showing an ultrasonic sensor according to one modified example of the second embodiment.

In the present embodiment, the pit portion 42b is formed on the bottom surface of the board storing portion 42 with the adhesive agent 9 injected into the pit portion 42b. Alternatively, as shown in FIG. 9, an annular rib 42c surrounding the peripheral edge of the opening of the communication hole 43 may be formed on the bottom surface of the board storing portion 42 to protrude from the peripheral edge of the opening of the communication hole 43.

In this case, the adhesive agent 9 is injected into the communication hole 43 through the annular rib 42c. By filling the communication hole 43 with the adhesive agent 9, it is possible to close the communication hole 43 and to seal the board storing portion 42.

Third Embodiment

Figure 10:
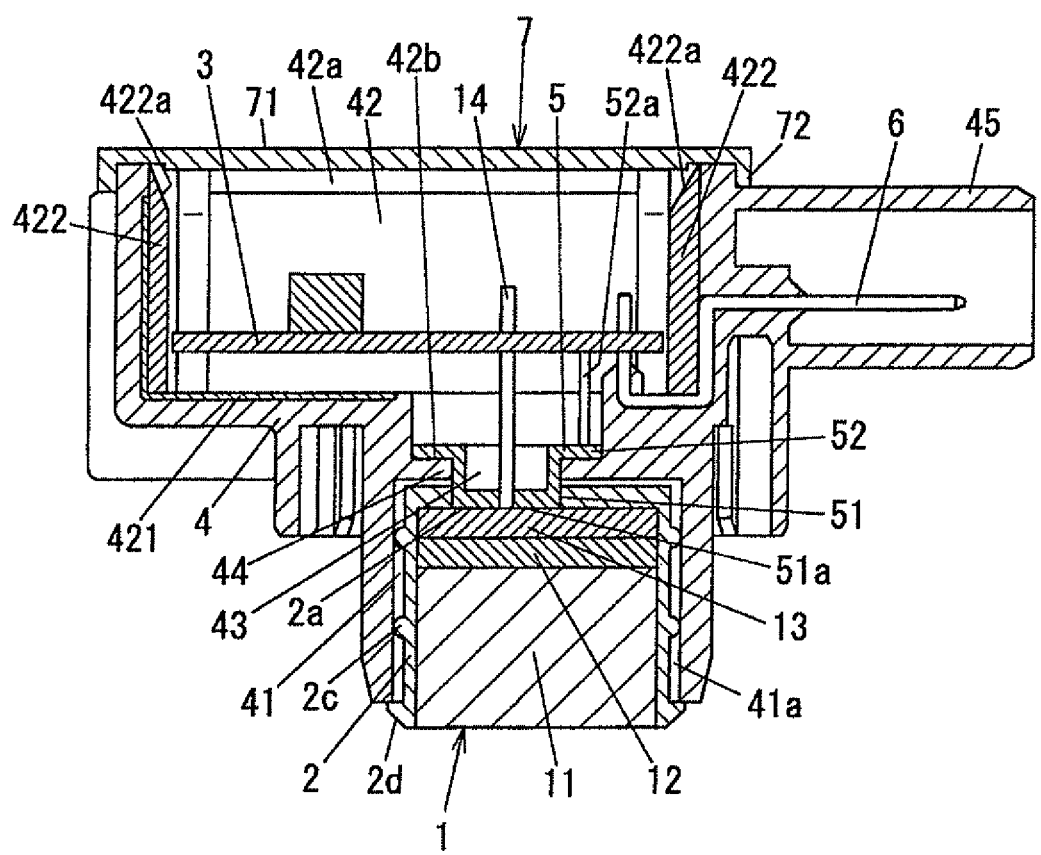
FIG. 10 is a section view showing an ultrasonic sensor according to a third embodiment of the present invention.

As shown in FIG. 10, the ultrasonic sensor of the present embodiment differs from the ultrasonic sensor of the first embodiment in that a projecting portion 52a is formed in the flange portion 52 of the seal plate 5. Other configurations remain the same as those of the first embodiment and therefore will be designated by like reference symbols with no description made thereon.

The seal plate 5 is a small component and the pit portion 42b is a narrow region surrounded by the inner wall surface of the board storing portion 42. This makes it difficult to perform a task of fixing the conventional seal plate 5 in place.

In the ultrasonic sensor of the present embodiment, the projecting portion 52a is installed to protrude from the flange portion 52 of the seal plate 5 toward the circuit board 3. When fixing the seal plate 5 to the pit portion 42b, a worker can grip the projecting portion 52a. This enables the worker to perform the fixing task with ease, thereby enhancing the workability.

When the circuit board 3 is attached, the tip end of the projecting portion 52a makes contact with the circuit board 3 and supports the circuit board 3. This eliminates the need to additionally form the support ribs 423 for supporting the circuit board 3, which makes it possible to simplify the structure of the ultrasonic sensor.

In addition, the projecting portion 52a supporting the circuit board 3 may be welded to the circuit board 3. This eliminates the need to provide the welding ribs 424, which makes it possible to further simplify the structure of the ultrasonic sensor.

Fourth Embodiment

Figure 11:
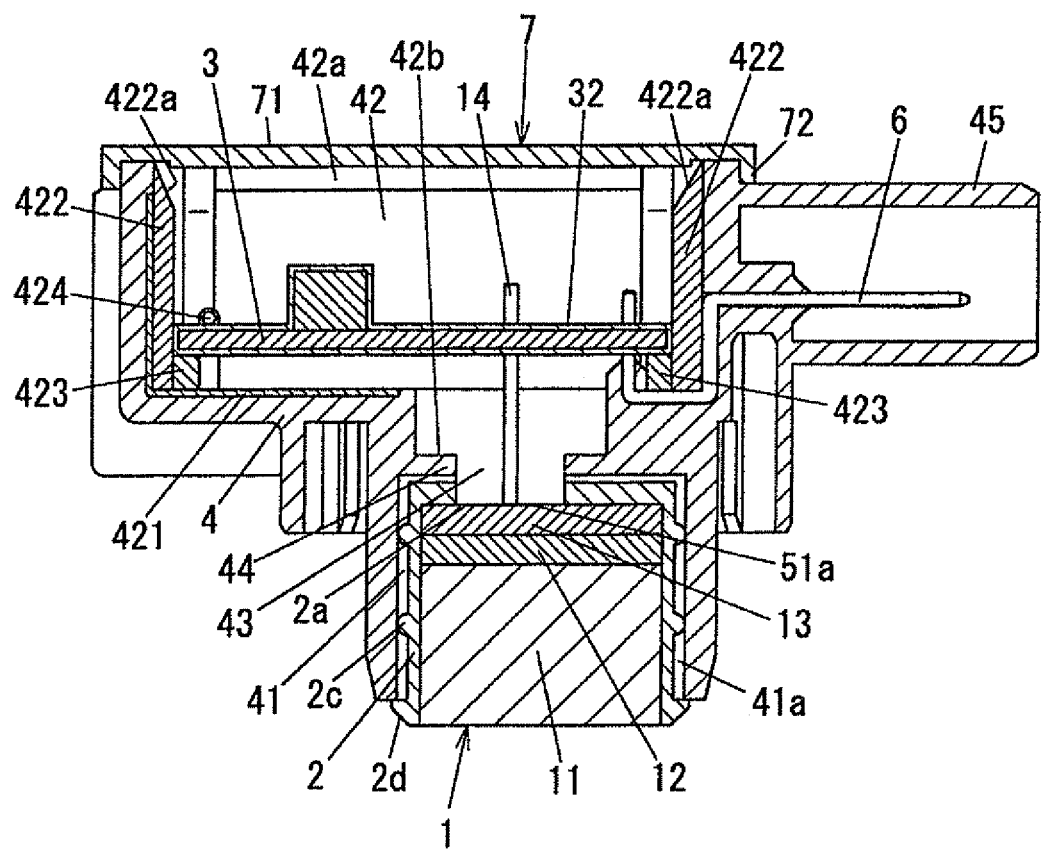
FIG. 11 is a section view showing an ultrasonic sensor according to a fourth embodiment of the present invention.

As shown in FIG. 11, the ultrasonic sensor of the present embodiment differs from the ultrasonic sensor of the first embodiment in that the seal plate 5 is omitted and the surface of the circuit board 3 is coated with a insulating material. Other configurations remain the same as those of the first embodiment and therefore will be designated by like reference symbols with no description made thereon.

The circuit board 3 has terminal insertion holes (not shown) into which the outer connection terminal 6 and the connector terminal 14 are inserted. The connection terminal 6 and the connector terminal 14 are connected to the circuit board 3 by soldering. A silicone material 32 is applied on the surface of the circuit board 3 except the peripheral edges of the openings of the terminal insertion holes. While the surface of the circuit board 3 is coated with the silicone material 32 in the present embodiment, the coating material is not limited to the silicone material 32 but may be other coating materials such as Humiseal (registered trademark) and the like.

Accordingly, even if moistures are infiltrated into the board storing portion 42 through the opening 42a of the board storing portion 42 or the communication hole 43, it is possible to prevent the wiring pattern of the circuit board 3 from getting wet and undergoing short-circuit.

Figure 12:
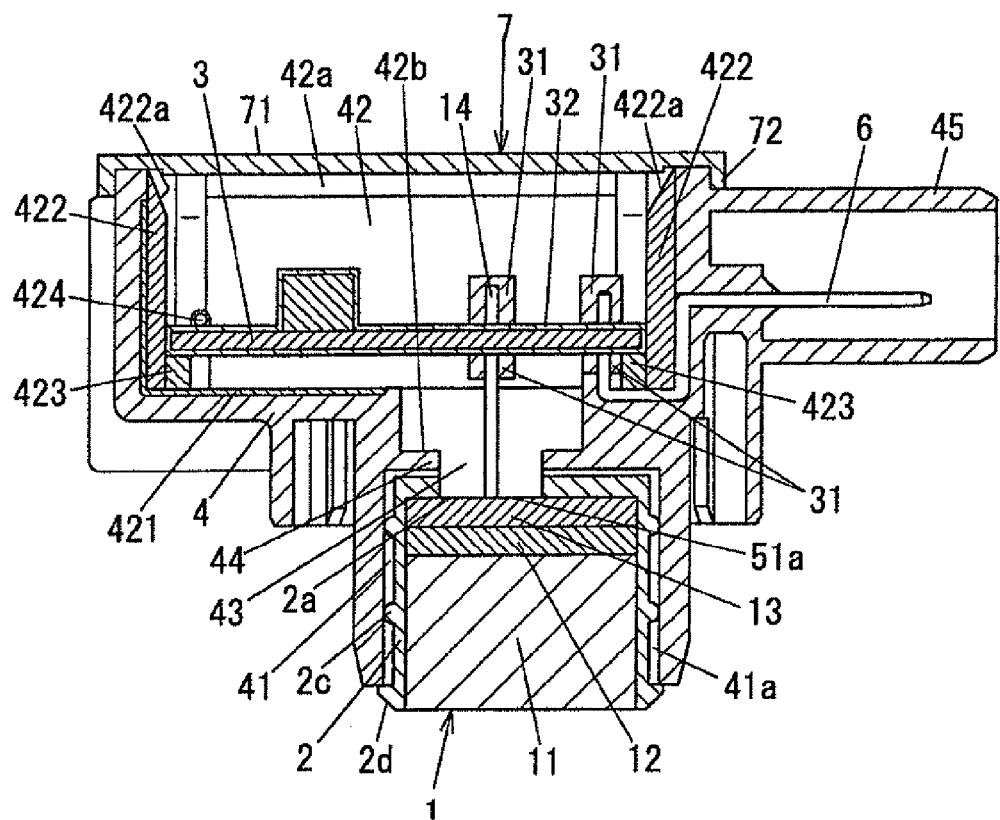
FIG. 12 is a section view of the ultrasonic sensor according to the fourth embodiment, which is provided with a terminal cover.
Figure 13:
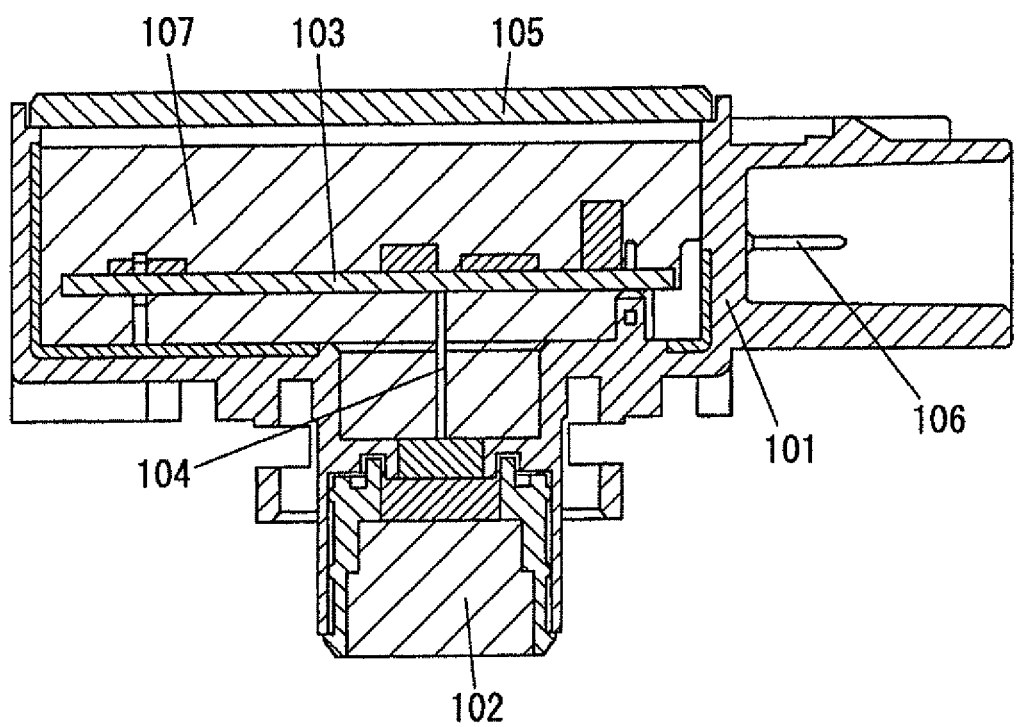
FIG. 13 is a section view illustrating a conventional ultrasonic sensor.

As shown in FIG. 12, terminal covers 31 for covering the outer connection terminal 6 and the connector terminal 14 inserted into the terminal insertion holes and soldered to the circuit board 3 are formed in the peripheral edges of the openings of the terminal insertion holes. The terminal covers 31 are arranged to cover only a specified length of the outer connection terminal 6 and the connector terminal measured from the surface of the circuit board 3. Accordingly, even if moistures are infiltrated into the board storing portion 42 through the opening 42a of the board storing portion 42 or the communication hole 43, it is possible to prevent the outer connection terminal 6 and the connector terminal 14 from getting wet and being short-circuited with each other.

With the ultrasonic sensor of the present embodiment, there is no need to fill a filler material into the board storing portion 42. It is therefore possible to suppress an increase in weight and cost. Moreover, it is possible to prevent generation of distortions in the circuit board 3 and to shorten a manufacturing time.

In the present embodiment, the insulating coating and the terminal covers 31 give a waterproof property to the circuit board 3. This eliminates the need to take the seal performance into account when welding the cover member 7 to the housing 4. Accordingly, it is possible to shorten the welding time and to reduce the number of work steps.

If the opening 42a of the board storing portion 42 is hermetically sealed with the cover member 7, it is possible to further enhance the waterproof property of the circuit board 3.

While certain preferred embodiments of the present invention have been described above, the present invention is not limited to these specific embodiments but may be modified or changed in many different forms without departing from the scope of the invention defined in the claims. Such modifications and changes shall be construed to fall within the scope of the present invention.

What is claimed is:

1. An ultrasonic sensor, comprising:
   a transceiver device for transmitting and receiving ultrasonic waves;
   a circuit board mounted with an electronic circuit processing ultrasonic signals transmitted and received through the transceiver device;
   a housing including a device storing portion storing the transceiver device, a board storing portion storing the circuit board and a communication hole for bringing the device storing portion and the board storing portion into communication with each other, the board storing portion having an opening;
   an electric connection unit extending through the communication hole to electrically interconnect the transceiver device and the circuit board;
   a cover member installed in the opening of the board storing portion to hermetically seal the board storing portion; and
   a seal plate closing the communication hole, the seal plate having a passage hole through which the electric connection unit extends,
   wherein the board storing portion is not filled with a filler material.

2. The sensor of claim 1, wherein the cover member installed in the opening is welded to the housing.

3. The sensor of claim 2, wherein the cover member is laser-welded to the housing.

4. The sensor of claim 2, wherein the cover member is ultrasonically welded to the housing.

5. The sensor of claim 1, wherein the cover member installed in the opening is adhesively bonded to the housing.

6. The sensor of claim 1, further comprising:
   a seal member interposed between the cover member and a peripheral edge of the opening of the board storing portion.

7. The sensor of claim 1, wherein the communication hole is closed by an adhesive agent.

8. The sensor of claim 7, wherein the board storing portion includes a pit portion having a bottom surface where one end of the communication hole is opened, the adhesive agent being filled in at least the communication hole.

9. The sensor of claim 7, wherein the board storing portion has a bottom surface where one end of the communication hole is opened and an annular rib arranged around the communication hole to protrude from the bottom surface of the board storing portion, the adhesive agent being filled in at least the communication hole.

10. The sensor of claim 1, wherein the seal plate is welded to the transceiver device.

11. The sensor of claim 10, wherein the seal plate is laser-welded to the transceiver device.

12. The sensor of claim 10, wherein the seal plate is ultrasonically welded to the transceiver device.

13. The sensor of claim 1, wherein the seal plate is welded to the housing.

14. The sensor of claim 13, wherein the seal plate is laser-welded to the housing.

15. The sensor of claim 13, wherein the seal plate is ultrasonically welded to the housing.

16. The sensor of claim 1, wherein the seal plate is temporarily fixed to the transceiver device by welding and then adhesively bonded to the transceiver device.

17. The sensor of claim 16, wherein the seal plate is temporarily fixed to the housing by welding and then adhesively bonded to the housing.

18. The sensor of claim 1, wherein a sealing material is provided in at least one of a gap between the seal plate and the transceiver device and a gap between the seal plate and the housing.

19. The sensor of claim 1, wherein the seal plate has a projecting portion gripped by a worker when assembling the ultrasonic sensor.

20. The sensor of claim 19, wherein the projecting portion is configured to support the circuit board.

21. The sensor of claim 20, wherein the projecting portion is welded to the circuit board to fix the circuit board in place.

22. The sensor of claim 1, wherein the circuit board is arranged in an opposing relationship with a bottom surface of the board storing portion, the board storing portion including a guide member for guiding the circuit board from the opening of the board storing portion to a specified position on the bottom surface of the board storing portion.

23. The sensor of claim 1, wherein the board storing portion includes a support rib supporting the circuit board and a welding rib welded to the circuit board to grip the circuit board in cooperation with the support rib.

24. The sensor of claim 1, wherein the board storing portion includes a support rib supporting the circuit board, the cover member including a top plate and a pressing protrusion extending from the top plate toward the support rib to grip and fix the circuit board in cooperation with the support rib.

25. An ultrasonic sensor, comprising:
   a transceiver device for transmitting and receiving ultrasonic waves;
   a circuit board mounted with an electronic circuit for processing ultrasonic signals transmitted and received through the transceiver device;
   a housing including a device storing portion storing the transceiver device, a board storing portion storing the circuit board and a communication hole for bringing the device storing portion and the board storing portion into communication with each other, the board storing portion having an opening; and
   an electric connection unit extending through the communication hole to electrically interconnect the transceiver device and the circuit board, the circuit board having a surface coated with an insulating material,
   wherein the board storing portion is not filled with a filler material.

* * * * *